(12) United States Patent
Ruzzier et al.

(10) Patent No.: US 7,921,673 B2
(45) Date of Patent: Apr. 12, 2011

(54) APPARATUS AND METHOD FOR MEASURING THE WEIGHT OF AN OPTICAL FIBER PREFORM DURING A CHEMICAL DEPOSITION PROCESS FOR FORMING THE PREFORM

(75) Inventors: Marco Ruzzier, Milan (IT); Andrea Demergazzi, Milan (IT); Davide Sarchi, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 1245 days.

(21) Appl. No.: 10/522,557

(22) PCT Filed: Jul. 31, 2002

(86) PCT No.: PCT/IB02/02967
§ 371 (c)(1),
(2), (4) Date: Aug. 18, 2006

(87) PCT Pub. No.: WO2004/014811
PCT Pub. Date: Feb. 19, 2004

(65) Prior Publication Data
US 2006/0288738 A1    Dec. 28, 2006

(51) Int. Cl.
*C03B 37/07* (2006.01)
(52) U.S. Cl. .............. 65/377; 65/484; 65/385; 65/413; 65/421
(58) Field of Classification Search ............ 65/377, 65/385, 411, 413, 421, 435, 475, 484, 531, 65/425
See application file for complete search history.

(56) References Cited

U.S. PATENT DOCUMENTS 4,293,231 A * 10/1981 Lyle ............................ 366/120
4,453,170 A * 6/1984 Arao ............................ 347/258
(Continued)

FOREIGN PATENT DOCUMENTS

EP    0 482 348 A2    9/1991
(Continued)

OTHER PUBLICATIONS

Machine Translation of JP 2001-163631, retrieved on Jul. 20, 2009, retrieved from http://www19.ipdl.inpit.go.jp/PA1/cgi-bin/PA1INDEX.*
(Continued)

*Primary Examiner* — Matthew J Daniels
*Assistant Examiner* — Yana Belyaev
(74) *Attorney, Agent, or Firm* — Finnegan, Henderson, Farabow, Garrett & Dunner, L.L.P.

(57) ABSTRACT

An apparatus for measuring the weight of a preform for optical fibers during a chemical deposition process for the formation of a preform is disclosed. The apparatus has at least one elastic constraint associated with at least one end portion of an elongated element made of a chemical deposition substrate for the formation of the preform, a device for inducing an oscillation, for example axial, on said elongated element, a device for detecting the frequency of oscillation of said elongated element, and a device for calculating the weight of the preform according to the detected frequency of oscillation. Advantageously, the device allows the realisation of a method for measuring the weight of the preform wherein the errors in measurement caused by thermal drift effects, by the axial distribution of the masses on the preform and by loads which are different from the mass of the preform in formation are reduced to below the required precision in measurement.

10 Claims, 6 Drawing Sheets

U.S. PATENT DOCUMENTS

| | | | | |
|---|---|---|---|---|
| 4,682,994 | A | * | 7/1987 | Mansfield .................. 65/421 |
| 5,233,261 | A | * | 8/1993 | Wajid ....................... 310/364 |
| 5,684,276 | A | * | 11/1997 | Altemir ................. 177/210 FP |
| 6,002,472 | A | * | 12/1999 | Naka et al. ............... 356/73.1 |
| 6,115,112 | A | * | 9/2000 | Hertzman et al. ......... 356/5.01 |

FOREIGN PATENT DOCUMENTS

| | | | |
|---|---|---|---|
| EP | 0 769 687 A1 | | 4/1997 |
| EP | 769687 A1 | * | 4/1997 |
| JP | 2001163631 | * | 12/1999 |
| JP | 2001163631 A | * | 6/2001 |

OTHER PUBLICATIONS

JP 2001163631(Machine Translation) [online], [retrieved on Oct. 28, 2009], retrieved from PAJ Database (http://www19.ipdl.inpit.go.jp/PA1/cgi-bin/PA1INDEX).*

EP 769687 (Machine Translation) [online], [retrieved on Oct. 28, 2009], retrieved from EPO Database (http://v3.espacenet.com/publicationDetails/biblio?CC=EP&NR=0769687A1&KC=A1&FT=D&date=19970423&DB=&locale=).*

Naka, et al.; "Method for Manufacturing Optical Fiber and Apparatus for Manufacturing Optical Fiber," Patent Abstracts of Japan of JP 2001-163631, (Dec. 9, 1999).

Wada, et al.; "Apparatus for Producing Optical Fiber Soot," Patent Abstracts of Japan of JP 06-329432, (Nov. 29, 1994).

Mikami, "Apparatus for Producing Porous Preform for Optical Fiber," Patent Abstracts of Japan of JP 07-215725, (Aug. 15, 1995).

Kazutama; "Device for Producing Optical Fiber Preform," Patent Abstracts of Japan of JP 06-183772, (Jul. 5, 1994).

Hatasa; "Production of Parent Material of Optical Fiber and Device Therefor," Patent Abstracts of Japan of JP 02-167838, (Jun. 28, 1990).

Shioya, et al.; "Production of Base Material for Optical Fiber," Patent Abstracts of Japan of JP 01-242435, (Sep. 27, 1989).

Miyamoto, et al.; "Quartz Based Fiber for Optical Communication and Production Thereof," Patent Abstracts of Japan of JP 63-285137, (Nov. 22, 1988).

Ishida; "Device for Producing Porous Optical Fiber Base Material," Patent Abstracts of Japan of JP 09-156946, (Jun. 17, 1997).

* cited by examiner

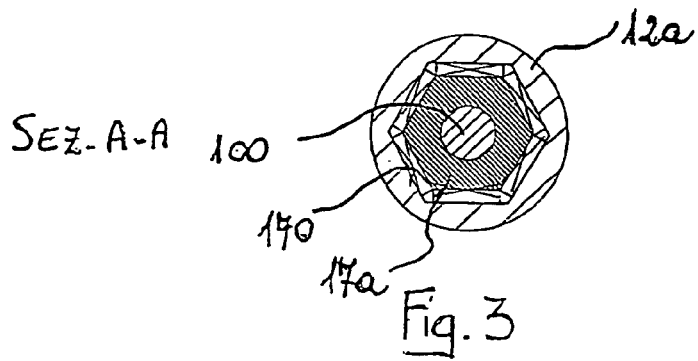
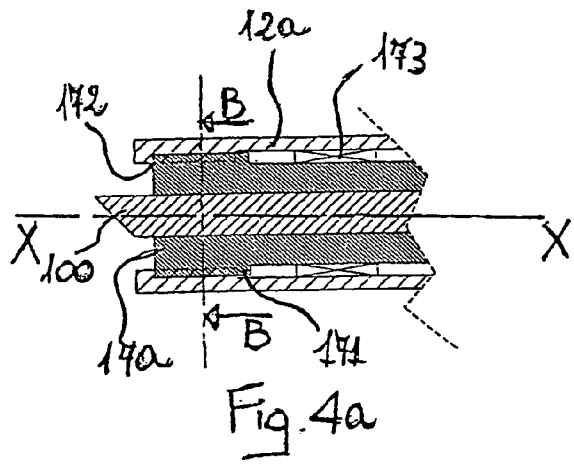
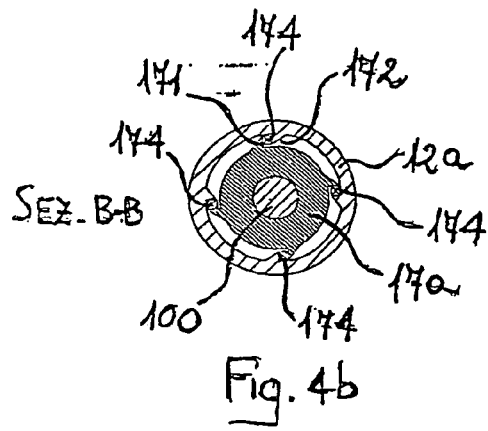
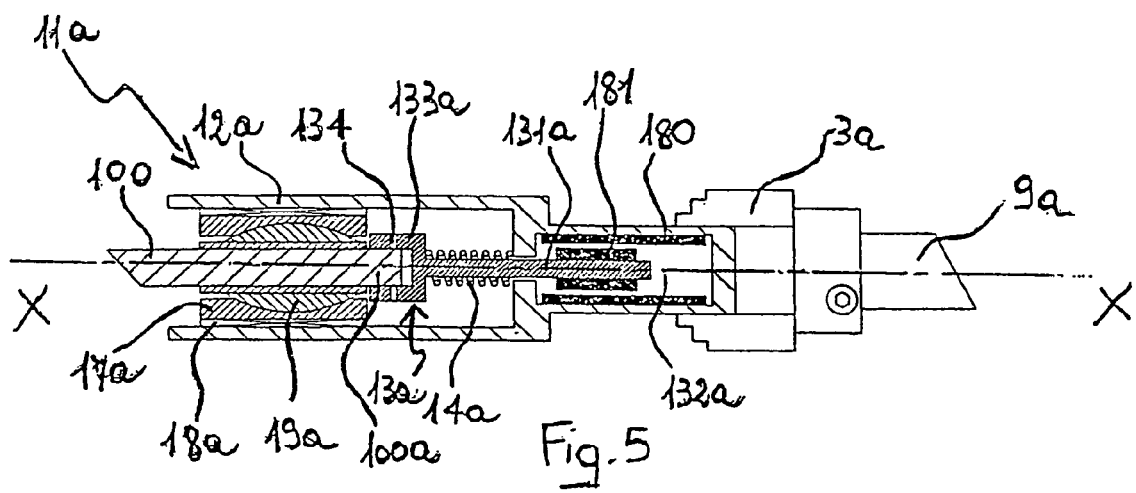

APPARATUS AND METHOD FOR MEASURING THE WEIGHT OF AN OPTICAL FIBER PREFORM DURING A CHEMICAL DEPOSITION PROCESS FOR FORMING THE PREFORM

CROSS REFERENCE TO RELATED APPLICATION

This application is a national phase application based on PCT/IB2002/002967, filed Jul. 31, 2002, the content of which is incorporated herein by reference.

BACKGROUND OF THE INVENTION

1. Field of the Invention

The present invention refers to an apparatus and method for measuring the weight of a preform for optical fibres during a chemical deposition process for the formation of the preform.

2. Description of the Related Art

As is known, the most common processes for manufacturing preforms for optical fibres foresee one or more chemical deposition steps, through one or more burners, of suitable chemical substances on a cylindrical support; the chemical substances typically comprise silicon and germanium, which are deposited in the form of oxides ($SiO_2$ and $GeO_2$). A suction hood eliminates the discharge gases produced by the burner.

Preform manufacturing process through chemical deposition of the prior art comprise processes of the VAD type (Vapor Axial Deposition), processes of the OVD type (Outside Vapor Deposition) and processes of the MCVD type (Modified Chemical Vapor Deposition).

Typically, in processes of the VAD type, the cylindrical support is kept in vertical position through the use of a clasping member acting upon an upper end of the cylindrical support; the cylindrical support is made to rotate upon itself so as to expose all of its surface to one or more burners housed near to the lower end of the support and in a position such as to emit a flow of reactants along a direction inclined by a predetermined angle with respect to the longitudinal axis of the support. The support is then made to translate upwards so as to allow a substantially axial growth of the preform.

In processes of the OVD type, on the other hand, the cylindrical support is kept in horizontal or vertical position through the use of a pair of clasping members acting upon the opposite ends of the support; this support is made to rotate upon itself so as to expose all of its surface to one or more burners laterally mounted with respect to the support and in a position such as to emit the flow of reactants along a direction substantially perpendicular to the longitudinal axis of the support. The burner, in particular, is mounted on a support structure equipped with a motorised moving member which allows the repeated translation of the burner parallel to the cylindrical support, so as to allow a substantially radial growth of the preform along all of the sections of the support.

In processes of the MCVD type, the deposition is carried out on the inner surface of a tubular support made to rotate about its axis, again through the use of a burner translating parallel to the axis of the support itself.

For the sake of simplicity, in the rest of the present description and in the subsequent claims explicit reference shall often be made to chemical deposition processes of the OVD type.

As is known, an important instrument for controlling and analysing the performance of the chemical deposition process is given by the measurement of weight in time, and consequently of the deposition-rate, of the preform in formation during the chemical deposition process. The measurement of the weight of the preform, indeed, besides giving information on the rate and efficiency of the chemical deposition in each of its steps, also gives advantages for the subsequent spinning steps of the optical fibre from the preform. The measurement of the weight also allows the value of the ratio between cladding/core masses to be worked out and controlled; knowing such a parameter is essential for guaranteeing the optic transmissive specification of the optical fibre spun from the preform.

Different devices for measuring the weight of a preform during a chemical deposition process for the formation of the preform are known.

JP06-329432 describes a chemical deposition process of the OVD type with horizontal configuration in which the preform is made to rotate about it own axis and is made to move horizontally above a fixed burner. A pair of opposite load cells measures the weight of the preform during the chemical deposition process. In order to lessen errors in the measurement of the weight caused by thermal variations and by misalignment of the supports of the preform caused by the movement of the preform itself during the chemical deposition process, four different constructive solutions are foreseen. A first solution foresees an alignment procedure carried out manually by an operator through adjustment of the supports of the base of the entire deposition machine. Checking of the alignment is obtained through an optical system consisting of a laser positioned on one of the supports of the preform and of a detector of the position of the laser beam positioned on the other support. A second solution foresees measurement of the misalignment through two laser distance detectors positioned on the supports of the preform, which measure its position with respect to two references; the adjustment is obtained through an automatic system which acts upon the supports of the deposition machine, such supports being suitably automated. A third solution foresees the elimination of the adjustment of the alignment of the machine. In this case the system carries out a correction via software of the signal of the distance sensors which measure the alignment. The fourth solution foresees, besides the methods already quoted, a system for cooling the structure of the deposition machine to counteract the thermal variations induced by the heat produced by the burner's flame. The temperature adjustment is obtained through a circuit equipped with a circulation pump crossed by demineralised water.

The Applicant observes that all of the solutions described above foresee the use of a system for measuring the alignment of the supports of the preforms and have the aim of eliminating just the misalignment problems through manual adjustment, or software or through thermal adjustment of the entire base of the deposition machine. However, no system is foreseen for eliminating or lessening other important sources of errors in the measurement of weight which shall be better described hereafter, like for example the thermal drift of the load cells (the effect of which is generally greater with respect to that of the expansion of the materials of the machine), the weight of the systems for anchoring the preforms and of the systems for transmitting motion to the preform, the constraint reactions imparted by the hyperstatic characteristics of the system for anchoring the preform, the dynamic action of the forces which transmit motion to the preform, as well as the dynamic actions linked for example to the rotation of the preform.

JP07-215725 described a chemical deposition process of the VAD type in which the preform, supported by an anchoring system, is made to rotate about its own axis and is moved vertically through a preform-moving device. The measurement of the weight of the preform in formation is carried out through a weight sensor arranged between the mobile part of the preform anchoring system and the preform-moving system. To increase the precision in the measurement of weight, between the mobile part of the preform anchoring system and the preform it is foreseen for there to be a mechanism of the active and passive type capable of absorbing the vibrations of the movement of the preform, such vibrations being the source of errors in the measurement of weight. The Applicant observes that such a device is not capable of lessening the errors in the measurement of weight mentioned above, like for example the thermal drift of the weight sensor, the forces transmitted by the anchoring system and system for transmitting motion to the preform and the dynamic actions of the systems for transmitting motion to the preform.

Further devices for measuring the weight of a preform during a chemical deposition process for the formation of the preform are described in JP06-183772, EP-482348, JP02-167838, JP01-242435, JP63-285137, JP09-156946. The Applicant observes that these still concern devices capable of carrying out a static measurement of the weight of the preform, and which therefore are subject to all of the errors in measurement mentioned above.

The Applicant has therefore specified a problem which is common to devices of the known type. Such a problem is linked to the fact that to measure the weight of the preform systems apt to carrying out a static measurement of the weight are used, such as for example load cells or sensors. In such systems, in particular, the weight is calculated by working out the vertical component of the forces acting upon the cells or sensors. The Applicant has verified that the measurement of the weight obtained through the use of load cells or sensors can be influences by various sources of errors, such as:

the drift of the signal caused by the heating of the load cells or sensors. Such a drift leads to high errors in measurement due to the non-uniformity of the thermal field which is realised on the cells. Such non-uniformity cannot always be eliminated through temperature compensation of the conventional type;

the action, on the cells or on the sensors, of loads which are different from the weight of the preform in formation. Indeed, the load cells are affected, besides by the weight of the preform, also by other static and dynamic types of force which it is not always possible to eliminate or quantify a priori. Static types of force typically comprise the weight of the preform anchoring systems, of the shafts and of the chucks associated with them, and of the systems for transmitting motion to the preform (typically belt or gear systems). Dynamic types of force, on the other hand typically comprise the dynamic actions of the systems for transmitting motion to the preforms. Another type of dynamic action is the inertia of the motion of the preform itself.

SUMMARY OF THE INVENTION

The Applicant has found that by carrying out a dynamic measurement of the weight of a preform supported through at least one elastic constraint and subjected to oscillations during the chemical deposition process, and by detecting the frequency of oscillation of the preform as a rigid body, it is possible to obtain a measurement of the weight of the preform which is substantially independent from the sources of error mentioned above, in particular the thermal drift of the measurement devices and the loads which are different from the mass of the preform the weight of which one wishes to measure.

The frequency of oscillation is indeed directly linked to the oscillating mass; for example, for an axial oscillation, the frequency of oscillation ω is linked to the oscillating mass M by the following relationship:

$$M = \frac{k}{\omega^2}$$

where k is the elastic constant of the spring system; therefore, by knowing the frequency of oscillation and the elastic constant of the spring system one knows the oscillating mass, and therefore the weight.

The present invention therefore refers, in a first aspect thereof, to an apparatus for measuring the weight of a preform for optical fibres during a chemical deposition process for the formation of the preform, characterised in that it comprises:

at least one elastic constraint intended to be associated with at least one end portion of an elongated element constituting a chemical deposition substrate for the formation of the preform;

a device for inducing an oscillation on said elongated element;

a device for detecting the frequency of oscillation of said elongated element;

a device for calculating the weight of the preform according to the detected frequency of oscillation.

In the rest of the present description and in the subsequent claims indistinct use shall be made of the term "elongated element" or "cylindrical support" to indicate the chemical deposition substrate from which, at the end of the deposition process, the preform is obtained.

In the rest of the present description and in the subsequent claims use shall also be made of the term "elastic constraint" to indicate any device for fixing the preform to the frame of the chemical deposition machine, such a fixing device comprising at least one elastic element, such as spring, suitable for applying an elastic action.

Advantageously, the measurement of the weight carried out through the apparatus of the present invention is a dynamic measurement and, as such, is not subject to the errors in measurement mentioned above with reference to the prior art.

Indeed, the measurement of the frequency of oscillation is not affected by the thermal drift of the measurement devices since the elastic characteristics of the elastic elements, such as the springs, have a very low dependency upon the temperature.

Moreover, the measurement of the frequency of oscillation can be made insensitive to the action of the variable loads, linked both to the transmission of motion to the preform and to the motion itself of the preform, sizing the measurement system so that such an action is applied at frequencies far from that of the measurement system, which is therefore not influenced.

Moreover, the measurement of the frequency of oscillation is completely insensitive to the axial distribution of the masses.

The Applicant has also observed that the measurement of the frequency of oscillation is more sensitive to the mass deposited for low mass values, i.e. at the start of the chemical deposition process. This characteristic is particularly interesting for external deposition processes, such as OVD or VAD;

the yield and the deposition rate of such processes are indeed critical in the initial steps of the process due to the small size of the preform in formation. Advantageously, the measurement of frequency is therefore capable of providing detailed information on the deposition process in its most critical steps.

Preferably, said at least one elastic constraint is a constraint with a single degree of freedom such as to allow an axial oscillation of said elongated element along its longitudinal axis X-X. Advantageously, since the frequency of axial oscillation ω is linked to the oscillating mass M of the preform by the following relationship:

$$M = \frac{k}{\omega^2}$$

where k is the elastic constant of the elastic element, knowing the elastic constant of the elastic element and the frequency of axial oscillation in time means that one knows the oscillating mass, and therefore the weight of the preform in formation. Since the above relationship is valid for an ideal harmonic oscillator, it is preferable, in the case of a real oscillator, to carry out a calibration of the system with known masses so as to experimentally determine the relationship M=M(ω).

In alternative embodiments of the apparatus of the present invention, other frequencies of oscillation of the rigid body can be used by realising any of the other manners of oscillation of a rigid body in one of its six degrees of freedom; in correspondence with the six degrees of freedom of a rigid body there are indeed three translational manners of oscillation and three rotational manners of oscillation to which respective frequencies of oscillation correspond.

Preferably, said at least one elastic constraint comprises:
  a first coupling element suitable for being rigidly associated with a rotatable chuck;
  a second coupling element suitable for being rigidly associated with said elongated element;
in which said first and second coupling elements are elastically and slidably coupled and are rotatably constrained.

Advantageously, said at least one elastic constraint is therefore capable of:
  preventing translations of the preform, with the exception of axial translation;
  preventing the relative rotation between chuck and preform about the axis of said preform (so as to allow the transmission of the rotary motion from the chuck to the preform);
  elastically constraining the axial translation of the preform about a position of equilibrium to allow its axial oscillation.

Preferably, said at least one elastic constraint comprises a spring operatively placed between said first and second coupling elements. The elastic sliding coupling between said coupling elements is thus realised.

Preferably, said first coupling element defines a first sleeve and said at least one elastic constraint also comprises a second sleeve rigidly associated with said at least one end portion of said elongated element and coaxially mounted inside said first sleeve through the interposition of at least one bearing suitable for allowing a relative sliding between said first and second sleeves along said axis X-X. The axial oscillation of the preform along the axis X-X is therefore advantageously guided by a sliding coupling between said first and second sleeves.

Preferably, the apparatus of the present invention also comprises a spherical joint placed between said second sleeve and said at least one end portion of said elongated element, to counter possible imprecisions of said elongated element.

In a first alternative embodiment of the present invention, said at least one elastic constraint preferably comprises a pin associated with said first coupling element and coupled with a slot formed on said second coupling element. It is therefore possible to realise the transmission of the rotary motion from chuck to the preform (through the first sleeve) and, at the same time, the axial oscillation of the preform.

In an alternative embodiment, the transmission of the motion from the chuck to the preform is realised through a shape fitting between said second sleeve, rigidly coupled with the preform, and said first sleeve, rigidly coupled with the chuck. The shape fitting can be realised, for example, by foreseeing non-circular sections for the conjugated surfaces of the two sleeves, for examples squared sections. Between the two sleeves a plurality of bearings are also advantageously foreseen suitable for allowing the relative sliding of the sleeves.

In a further alternative embodiment, the transmission of the motion from the chuck to the preform is realised through a magnetic device comprising at least one permanent magnet integral with the first sleeve and at least one magnet integral with the second sleeve.

The apparatus of the present invention can advantageously be used both in chemical deposition processes with horizontal configuration (longitudinal axis X-X of the elongated element arranged horizontally) and in processes with vertical configuration (longitudinal axis X-X of the elongated element arranged vertically).

In the case of horizontal process configuration, the apparatus preferably comprises two opposite sliding elastic constraints associated with opposite end portions of said elongated element. The presence of elastic elements in correspondence with the two opposite ends of the elongated element, in horizontal process configuration, is particularly preferred in the specific case in which traction or compression springs are used as elastic elements; such springs are placed in stretched condition (in the case of a traction spring) or compressed condition (in the case of a compression spring), between the two coupling elements of respective elastic constraints; the two springs thus apply a reciprocal action such as to avoid that they can discharge (in such a case it would be impossible to realise the desired oscillation of the elongated element). The elastic constant of the system is given in this case by the sum of the elastic constants of the two springs.

In an alternative embodiment of the apparatus of the present invention for a horizontal process configuration, the apparatus comprises a single elastic constraint associated with an end portion of said elongated element, said elastic constraint being intended to work both by traction and by compression. Preferably, the elastic constraint shall comprise a spring bound at opposite sides to the two coupling elements, so as to be able to apply both a thrusting elastic action and a pulling elastic action of the elongated element. The elastic constant of the system shall be given, in this case, by the elastic constant of the single spring present in the single elastic constraint of the apparatus.

Preferably, the apparatus in such a case comprises a sliding guide associated with said elongated element on the opposite side to said elastic constraint.

In the case of vertical process configuration, the apparatus preferably comprises a single sliding elastic constraint suitable for being associated with an end portion of said elongated element. Advantageously, it is possible to use a single elastic constraint since the elastic element of such a constraint shall always be in compressed condition (if the elastic constraint is associated with the lower end of the elongated element) or stretched condition (if the elastic constraint is associated with the upper end of the elongated element) due to the weight of the preform. The embodiment with a single sliding elastic constraint in correspondence with the upper end portion of the elongated element is preferred, for example, in chemical deposition processes of the VAD type. In chemical deposition processes of the OVD types, on the other hand, the embodiment with a single elastic constraint in correspondence with the lower end and with a sliding guide in correspondence with the upper end, or vice-versa, is preferred.

Preferably, the device for inducing the oscillation is housed inside said at least one elastic constraint.

In a first embodiment thereof, the device for inducing the oscillation comprises a pneumatic device acting upon said second coupling element. In particular, said pneumatic device comprises a small thrusting piston which, actuated by compressed air, acts upon said second coupling element loading the elastic element of the elastic constraint; by discharging the air the elongated element starts oscillating about the position of equilibrium of the elastic element.

In a second preferred embodiment thereof, the device for inducing the oscillation comprises an electromagnetic device acting upon said second coupling element. In particular, the electromagnetic device comprises a solenoid arranged outside of the second coupling element and a permanent magnet integral with said second coupling element. The supply of current into the solenoid produces the axial force on the second coupling element, loading the elastic element of the elastic constraint; by interrupting the supply of current the elongated element begins to oscillate about the position of equilibrium of the elastic element.

Alternatively, it can be thought of not to create a suitable device for inducing the oscillation and to exploit the oscillations induced on the preform by the chemical deposition machine itself; such a machine can indeed itself represent a device for inducing the oscillation on the preform.

Preferably, the device for detecting the frequency of oscillation comprises a device for detecting the position of said elongated element, suitable for generating a signal indicating said position, and a device for processing said signal to work out the frequency of oscillation of the elongated element.

Preferably, the device for detecting the position of said elongated element comprises a target intended to be rigidly associated with said elongated element and an optical measurer of the distance of said target.

Preferably, the optical measurer comprises an emission source of a luminous signal towards said target, a device for receiving the luminous signal scattered by said target and a device for processing the luminous signal collected to generate an electrical signal representing the distance of said target.

In an alternative embodiment, the detection of the frequency of oscillation is realised through a proximity sensor associated with said first coupling element and suitable for detecting the position in time of said second coupling element. In the case in which the elastic element is a spring, the same spring can advantageously be used as proximity sensor, which is no other than a solenoid having an inductance that varies with elongation.

In a second aspect thereof, the invention regards a method for measuring the weight of a preform for optical fibres during a chemical deposition process for the formation of the preform, characterised in that it comprises the steps of:

elastically constraining an elongated element constituting a chemical deposition substrate to a chemical deposition machine for the formation of the preform;
inducing an oscillation of said elongated element;
detecting the frequency of oscillation of said elongated element;
calculating the weight of the preform according to the detected frequency of oscillation.

Such a method allows all of the advantages highlighted above with reference to the weight measurement apparatus of the present invention to be achieved.

In a first embodiment of the method of the present invention, the step of inducing an oscillation of said elongated element comprises the following steps:
supplying pressurised air, for a predetermined time, inside a seat housing an end portion of said elongated element;
discharging the air from said seat after said predetermined time.

In a second embodiment of the method of the present invention, the step of inducing an oscillation of said elongated element comprises the following steps:
supplying current, for a predetermined time, into a solenoid arranged outside of and coaxially with a coupling element associated with said elongated element, such a coupling element comprising at least one permanent magnet;
interrupting the supply of current after said predetermined time.

Preferably, the step of detecting the frequency of oscillation of said elongated element comprises the following steps:
generating a signal representing the position in time of said elongated element;
processing said signal to work out the frequency of oscillation of the elongated element.

Preferably, the step of generating a signal representing the position in time of said elongated element comprises the steps of:
sending a luminous signal towards a target rigidly associated with said elongated element;
collecting a luminous signal scattered by said target; and
processing the collected luminous signal to generate an electric signal representing the distance of said target.

In a third aspect thereof, the invention regards a chemical deposition machine for the formation of a preform for optical fibres, comprising:
a frame intended to support along an axis X-X an elongated element constituting a chemical deposition substrate for the formation of a preform;
at least one burner intended to deposit a chemical substance for the formation of the preform on said substrate;
characterised in that it comprises an apparatus for measuring the weight of the preform of the type described above.

Such a machine allows all of the advantages described above with reference to the weight measurement apparatus of the present invention to be achieved.

In a fourth aspect thereof, the invention regards a chemical deposition process for the formation of a preform for optical fibres, characterised in that it comprises a step of measuring the weight of the preform, during the chemical deposition, through the weight measurement method described above.

BRIEF DESCRIPTION OF THE DRAWINGS

Further characteristics and advantages of the present invention shall become clearer from the following detailed description of some of its preferred embodiments, given with reference to the attached drawings. In such drawings.

FIG. 3 is an enlarged schematic view of a cross section, taken along the section line A-A of FIG. 1, of an alternative embodiment of a device for transmitting the motion to the preform of the machine of FIG. 1;

FIG. 4a is an enlarged schematic view of a longitudinal section of a further alternative embodiment of a device for transmitting the motion to the preform of the apparatus of FIG. 1;

FIG. 4b is an enlarged schematic view of a cross section of the device of FIG. 4a, taken along the section line B-B;

FIG. 5 is an enlarged schematic view of a further alternative embodiment of a device for transmitting the motion to the preform of the machine of FIG. 1;

DETAILED DESCRIPTION OF THE INVENTION

Figure 1:
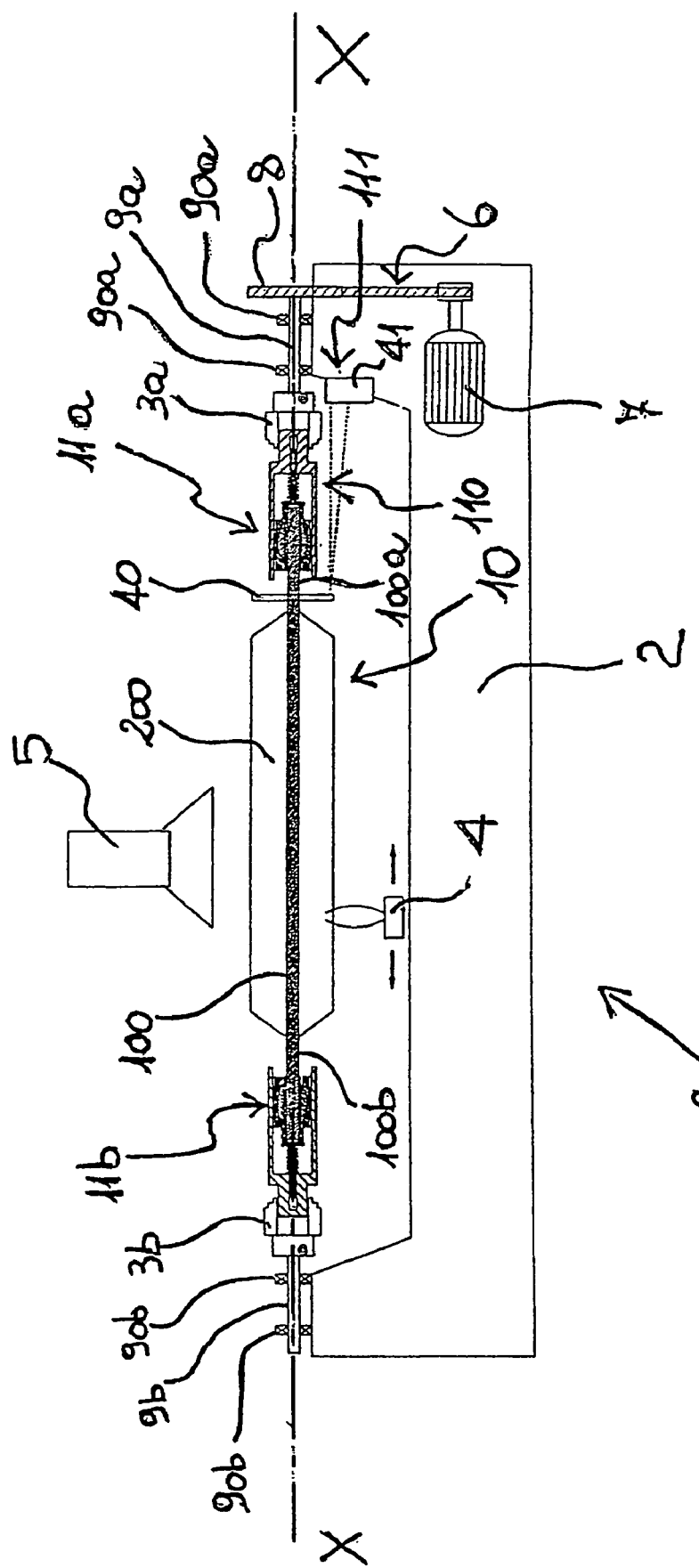
FIG. 1 is a schematic view of a chemical deposition machine for the formation of a preform, comprising an apparatus for measuring the weight of the preform in accordance with the present invention.

In FIG. 1, a chemical deposition machine for the formation of a preform for optical fibres is indicated with 1, including an apparatus 10 for measuring the weight of the preform during the chemical deposition process, in accordance with the present invention.

The machine 1 illustrated in FIG. 1 is a machine with a horizontal attitude (axis X-X of the chemical deposition substrate arranged horizontally) and is suitable for realising a chemical deposition through a process of the OVD type (Outside Vapor Deposition). Although the present description shall be made with reference to such a machine, that which is said hereafter and in the subsequent claims also has analogous application for machines with a vertical attitude (axis X-X of the chemical deposition substrate arranged vertically), unless something is explicitly stated to the contrary. In the same way, that which is said also applies to machines suitable for realising a chemical deposition process of a different type, such as a process of the VAD type (Vapor Axial Deposition) or a process of the MCVD type (Modified Chemical Vapor Deposition).

The machine 1 comprises a frame 2 equipped with opposite rotatable chucks 3a, 3b, of the conventional type, suitable for supporting, along an axis X-X, an elongated element 100 (hereafter also indicated with the term: cylindrical support) constituting a chemical deposition substrate for the formation of a preform. The chucks 3a and 3b are such as to rotatably bind the cylindrical support 100 so as to transmit rotary motion to it.

The machine 1 also comprises a burner 4, of the conventional type, intended to deposit on the cylindrical support 100 a chemical substance for the formation of a preform, in particular a mixture of silicon and germanium, or just silicon, in the form of oxides ($SiO_2$ e $GeO_2$), so as to realise, at the end of the chemical deposition process, a preform 200. On the opposite side of the burner 4 with respect to the axis X-X, a suction hood 5 is foreseen intended to collect and evacuate the chemical discharge substances produced by the burner 4.

In the embodiment of the machine 1 illustrated in FIG. 1, the burner 4 moves, during the chemical deposition process, parallel to the axis X-X of the cylindrical support 100, which in turn rotates about the axis X-X so as to expose all of its surface to the burner 4. The hood 5 can be still or can move parallel to the burner 4. That which is stated hereafter, in any case, also has analogous application in the case in which the burner 4 is fixed and the elongated element 100, besides rotating about its own axis X-X, displaces along such an axis so as to expose all of its surface to the burner 4, or furthermore in the case in which both the burner and the elongated element 100 move along the axis X-X.

In accordance with the embodiment illustrated in FIG. 1, the rotary motion is transmitted to the chuck 3a through a belt mechanism 6, of the conventional type, actuated by an electric motor 7. Through the belt 6 the motion arrives at a pulley 8 integral with a small shaft 9a supported on the frame 2 by suitable rolling bearings 90a and upon which the chuck 3a is rigidly mounted. On the opposite side, the chuck 3b is rigidly mounted on a small shaft 9b supported on the frame 2 coaxially with the small shaft 9a by suitable rolling bearings 90b.

As an alternative to the belt 6 suitable entirely conventional motion transmission gears can be foreseen.

In the chemical deposition machine 1 the cylindrical support 100 is not rigidly associated with the chucks 3a, 3b, but rather is elastically associated, in correspondence with the opposite free end portions 100a, 100b, with opposite elastic constraints 11a, 11b, which, in turn, are rigidly associated with the chucks 3a, 3b.

The elastic constraints 11a, 11b are an integral part of the apparatus 10 suitable for measuring the weight of the preform during the chemical deposition process. Such an apparatus (illustrated in FIG. 8) also comprises a device 110 for inducing an oscillation on said elongated element 100, a device 111 for detecting the frequency of said oscillation and a device 112 for calculating the weight of the preform according to the detected frequency of oscillation. Such devices shall be described in detail in the rest of the present description.

Figure 2:
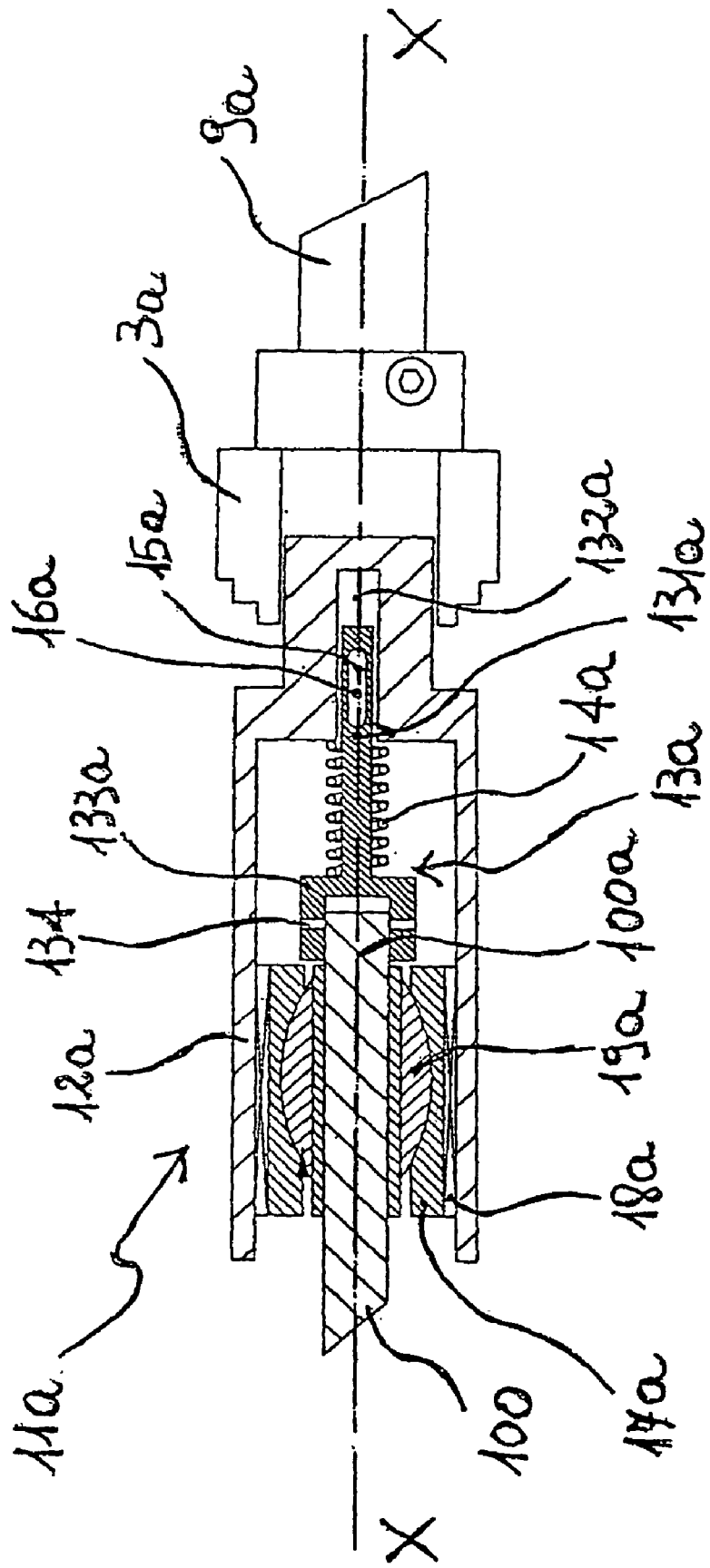
FIG. 2 is an enlarged schematic view of a longitudinal section of a constructive detail relative to a first embodiment of a device for fixing the preform and of a device for transmitting the motion to the preform of the machine of FIG. 1.

FIG. 2 shows in detail a constructive example of an elastic constraint 11a of the apparatus 10 for measuring the weight of a preform (and of the chemical deposition machine 1 for the formation of the preform) according to the present invention.

The elastic constraint 11a is illustrated associated with the chuck 3a of the chemical deposition machine 1 illustrated in FIG. 1. The elastic constraint 11a comprises a first coupling element 12a rigidly associated with the chuck 3a and a second coupling element 13a rigidly associated with an end portion 100a of the cylindrical support 100. In the illustrated example, the first coupling element 12a is a sleeve and the second coupling element 13a is a gripping member of said elongated element 100. The gripping member 13a is housed inside the sleeve 12a and is shaped like a piston, with a shank 131a housed in a sliding seat 132a formed inside the sleeve 12a, and a head 133a associated with the free end of the cylindrical support 100 through one or more nuts or pins 134.

The gripping member 13a is in turn associated with the sleeve 12a through an elastic element 14a extending along the axis X-X, in this specific example a compression spring extending coaxially and externally to the shank 131a of the gripping member 13a. In the shank 131a of the gripping member 13a a slot 15a is formed inside which a pin 16a is housed integral with the sleeve 12a. The coupling between pin 16a and slot 15a is a purely sliding coupling, in the sense that the only relative movement allowed is that of the sliding of the pin 16a in the slot 15a. The pin 16a, when the sleeve 12a is actuated into rotation by the chuck 3a, forces the gripping member 13a, and therefore the cylindrical support 100 associated with it, into rotation.

The structural configuration of the elastic constraint 11a described above is therefore such as to prevent the translations of the cylindrical support 100, with the exception of that along the axis X-X, to prevent the relative rotation between chuck 3a and cylindrical support 100 about the axis X-X (so as to allow the transmission of the rotary motion from the chuck 3a to the cylindrical support 100) and to elastically restrain the axial translation of the cylindrical support 100.

The elastic constraint 11a described above is therefore a sliding elastic constraint with a single degree of freedom, i.e. such as to allow exclusively an oscillation of the cylindrical support 100 along the axis X-X inside the sleeve 11a about a position of equilibrium of the spring 14a.

The elastic constraint 11a also comprises a further sleeve 17a rigidly associated with the end portion 100a of the cylindrical support 100. The sleeve 17a is coaxially coupled with the sleeve 12a through the interposition of a bearing 18a suitable for allowing the relative sliding between said sleeves along the axis X-X. The sliding coupling between sleeve 12a and sleeve 17a is therefore such as to guide the axial sliding of the cylindrical support 100 inside the sleeve 12a.

Between the sleeve 17a and the cylindrical support 100 a ball joint 19a suitable for countering possible imprecisions of the cylindrical support 100 is preferably foreseen.

The elastic constraint 11b is substantially identical to the constraint 11a described above. The cylindrical support 100 is therefore elastically bound in correspondence with the opposite free ends 100a, 100b.

The springs 14 of the two elastic constraints 11a, 11b are preferably both compression or traction springs. They are placed between the sleeve 12a and the gripping means 13a in such a way as to both be biased (in compressed condition, in the case of compression springs, or stretched state, in the case of traction springs) when the cylindrical support 100 is loaded onto the machine 1, so as to apply a mutual elastic action.

Alternatively, it is possible to foresee a single elastic constraint 11a associated with an end portion 100a of said elongated element 100. Such an elastic constraint shall, in such a case, comprise a spring 14a bound on one side to the sleeve 12a and on the opposite side to the gripping member 13a, so as to be able to apply upon the gripping member 13a both an elastic thrusting action and an elastic pulling action. Preferably, in correspondence with the opposite end 100b of the elongated element 100 a simple sliding guide is in such a case foreseen.

It should be noted that, in the case of a machine with a vertical attitude (axis X-X of the chemical deposition substrate arranged vertically) the sliding elastic constraint associated with one of the two end portions of the cylindrical support can be replaced with a sliding guide without any elastic element. In such a process configuration it is indeed possible to eliminate an elastic constraint since the elastic element of the single elastic constraint foreseen is always biased (in compressed condition, if the elastic constraint is foreseen in correspondence with the lower end of the elongated element, or in stretched condition if the elastic constraint is foreseen in correspondence with the upper end of the elongated element) due to the weight of the preform. Such an elastic element, therefore, can never be discharged, a necessary condition for realising the axial oscillation of the cylindrical support.

It is possible to foresee numerous variants relative to the system for transmitting the rotary motion from the chuck 3a, 3b to the cylindrical support 100 for chemical deposition.

For example, in a first variant, illustrated in FIG. 3, the rotary motion of the chuck 3a is transmitted to the cylindrical support 100 realising, instead of the sliding coupling between pin 16a and slot 15a, a shape fitting between outer surface of the sleeve 17a rigidly associated with the cylindrical support 100 and inner surface of the sleeve 12a rigidly associated with the chuck 3a. In such a case, the sections of the sleeve 17a and of the sleeve 12a shall have non-circular symmetry, for example squared, or hexagonal, as illustrated in FIG. 3. Between the two sleeves a plurality of bearings 170 suitable for allowing the relative sliding of the sleeves are advantageously foreseen.

In a second variant, illustrated in FIGS. 4a and 4b, on the outer surface of the sleeve 17a and on the inner surface of the sleeve 12a opposite edges are realised, respectively indicated with 171 and 172 (for example four equally spaced edges on each sleeve, as illustrated), suitable for mutually cooperating in abutment during the rotation of the chuck 3a, in such a way that the sleeve 12a forces the sleeve 17a, and therefore the cylindrical support 100, into rotation. Between the two sleeves, in correspondence with a longitudinal portion upstream or downstream of the one in which the edges 171, 172 are formed, a plurality of bearings 173 are also foreseen suitable for allowing the relative sliding between the two sleeves. Further bearings 174 suitable for easing such a relative sliding are foreseen between the edges 171 and 172.

In a further variant, illustrated in FIG. 5, the rotary motion of the chuck 3a is transmitted to the cylindrical support 100 realising, instead of the sliding coupling between pin 16a and slot 15a, a magnetic transmission between the sleeve 12a, integral with the chuck 3a, and the gripping member 13a, integral with the cylindrical support 100. In such a case, inside the sliding seat 132a of the sleeve 12a a permanent magnet 180 is rigidly mounted; in the same way, in the outer surface of the free end portion of the shank 131a of the gripping member 13a another permanent magnet 181 is rigidly mounted. The magnetic action between the two magnets realises the constraint in rotation, in the sense that when the sleeve 12a rotates it forces the gripping member 13a, and therefore the cylindrical support 100, into rotation.

As already stated, the apparatus 10 of the present invention comprises a device 110 (FIGS. 6, 7 and 8) for inducing an oscillation of the cylindrical support 100 during the chemical deposition process. Such a device is preferably housed inside either of the two elastic constraints 11a, 11b, and is an integral part of such an elastic constraint.

Figure 6:
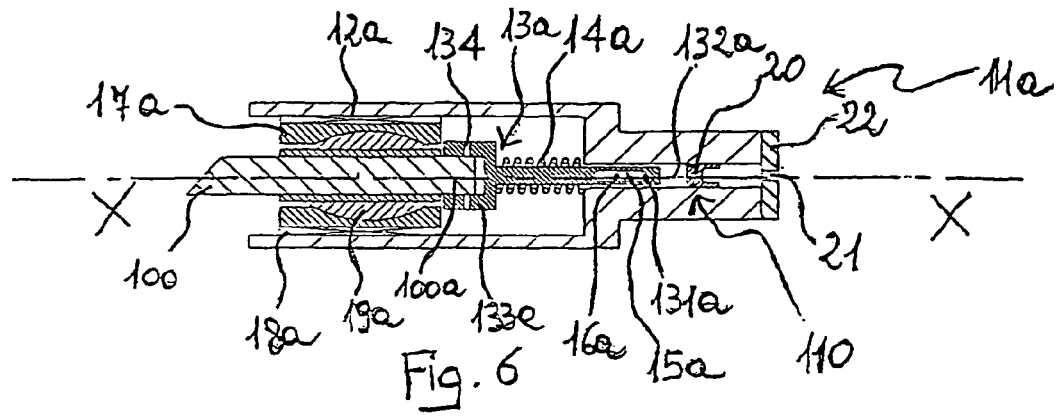
FIG. 6 is an enlarged schematic view of a first embodiment of a device for inducing oscillation of the machine of FIG. 1 in the embodiment of FIG. 2.

In a first embodiment thereof, illustrated in FIG. 6, the device 110 is a pneumatic device comprising a small thrusting piston 20 slidably housed in the sliding seat 132a of the sleeve 12a. Such a small piston 20 is actuated by pressurised air coming into the seat 132a through a suitable opening 21. Such an opening is formed on a cover 22 arranged in correspondence with the free end of the sleeve 12a. The thrusting small piston 20, when actuated, cooperates with the shank 131a of the gripping member 13a, thrusting it to slide in the seat 132a of the sleeve 12a, loading the spring 14a; at the moment when the air pressure is discharged, the gripping member 13a (and therefore the cylindrical support 100 rigidly associated with it) begins to oscillate about the position of equilibrium of the spring 14a.

Figure 7:
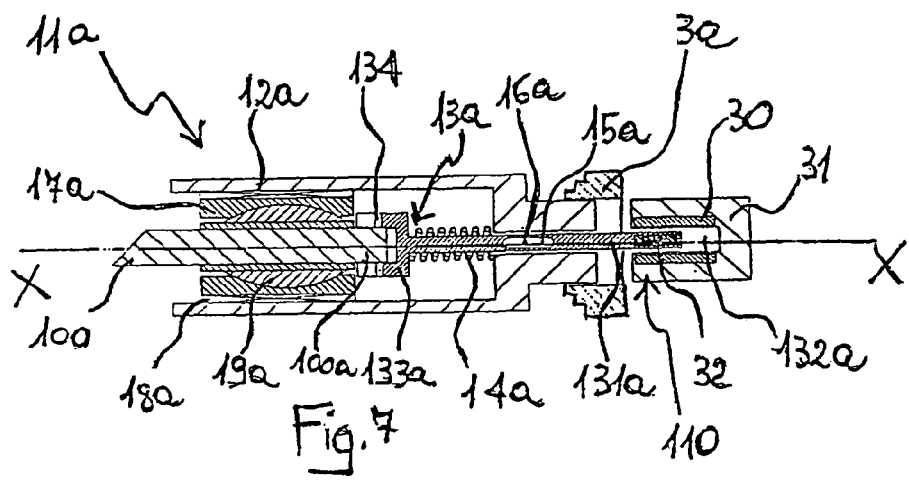
FIG. 7 is an enlarged schematic view of a second embodiment of a device for inducing oscillation of the machine of FIG. 1 in the embodiment of FIG. 2.

In an alternative embodiment thereof, illustrated in FIG. 7, the device 110 for inducing the oscillation is an electromagnetic device comprising a solenoid 30 rigidly associated with a stator 31 foreseen upstream of the chuck 3a. The solenoid 30 is coaxial to the shank 131a of the gripping member 13a, which in turn houses a permanent magnet 32. The passage of current into the solenoid 30 produces the axial force on the gripping member 13a loading the spring 14a; by interrupting the supply of current into the solenoid 30 the gripping member 13a begins to oscillate about the position of equilibrium of the spring 14a.

Figure 8:
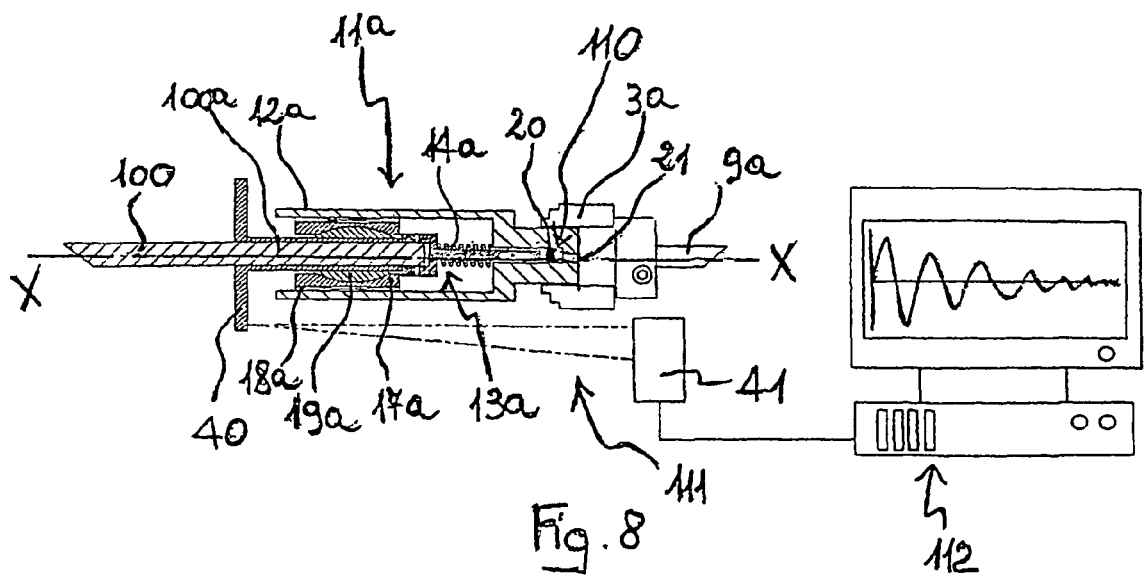
FIG. 8 is an enlarged schematic view of an oscillation detection device of the machine of FIG. 1 in the embodiment of FIG. 2.

As illustrated in FIG. 8, the apparatus of the present invention also comprises a device 111 for detecting the frequency of oscillation of the cylindrical support 100 during the chemical deposition process. Such a device comprises, in particular, a device for detecting the position in time of the cylindrical support 100 and for generating a signal representing said position, and a device for processing said signal to work out the frequency of oscillation of such a support.

In the embodiment illustrated in FIG. 8, the device for detecting the signal representing the position in time of the cylindrical support 100 comprises a target 40 rigidly associated with the end portion 100a of the cylindrical support 100, and an optical measurer 41 suitable for measuring the distance of said target 40. In particular, the optical measurer 41 comprises an emission source (not illustrated) of a luminous signal towards the target 40, a device (not illustrated) for receiving the luminous signal scattered by the target 40, and a device (not illustrated) for processing the collected luminous signal to generate an electric signal representing the distance of the target 40. The measurer 41 is equipped with an output capable of transmitting the electric signal to a calculator 112 equipped with a data acquisition board intended to calculate the weight of the preform according to the frequency of oscillation detected.

As an alternative to the device described above it is possible to use other devices (not illustrated) for measuring the frequency of oscillation of the preform. For example, the detection of the frequency of oscillation can be realised through a proximity sensor associated with the sleeve 12a and suitable for detecting the position in time of the gripping member 13a. As proximity sensor the same spring 14a can advantageously be used, which is no other than a solenoid with variable inductance with elongation.

In principle, since the frequency of axial oscillation $\omega$ is linked to the oscillating mass M by the following relationship:

$$M = \frac{k}{\omega^2}$$

where k is the elastic constant of the spring 14a, knowing the elastic constant K of the spring 14a and the frequency of axial oscillation of the preform 200 during the chemical deposition process means that the mass, and therefore the weight of the preform 200 in formation, is known.

Various methods for calculating the frequency of oscillation are possible. As an example one of these is described in detail.

Through the calculator 112 equipped with an acquisition board the electric signal coming from the optical measurer 41 is continuously analysed. The frequency of acquisition of the signal must be such as to be able to correctly describe the electric signal, for example it is sufficient for it to be greater than double the frequency of the signal. In this case the frequency of sampling is equal to:

$$\omega_{\min} = 2 \cdot \sqrt{\frac{K}{M_{\min}}}$$

where K is the elastic constant of the elastic system and $M_{min}$ is the smallest oscillating mass, i.e. equal to the mass of the cylindrical support 100 at the start of the chemical deposition process. It should be noted that, in the case of a machine with a horizontal attitude, such as the one illustrated in the attached figures, the elastic system comprises two elastic constraints 11a, 11b, each equipped with a respective spring 14. Therefore the elastic constant of the system shall be equal to the sum of the elastic constants of the individual springs present in the two opposite elastic constraints 11a, 11b. On the other hand, in the case of a machine with a vertical attitude, if it is with a single elastic constraint, the elastic constant of the system shall be equal to the elastic constant of the single spring foreseen in the single elastic constraint of the apparatus.

Through a threshold system, the registering of the electric signal is activated at the moment when the oscillation starts; the registering is then extended for a determined time (chosen experimentally in such a way as to be greater than the damping time of the oscillation). The electric signal can be well described by a function of the type:

$$S(t) = A \cdot e^{-\alpha t} \cdot \sin(\omega t + \Phi) + \Delta$$

therefore, through a non-linear regression calculation, it is possible to estimate the parameters A, $\alpha$, $\phi$, $\Delta$ and finally the frequency $\omega$.

Given the frequency it is possible to evaluate the oscillating mass through the relationship:

$$M = \frac{k}{\omega^2}$$

valid in the case of an ideal harmonic oscillator; in a real situation it is preferable to carry out a calibration of the system with known masses so as to experimentally determine the relationship $M = M(\omega)$.

In further alternative embodiments, the other frequencies of oscillation of the cylindrical support 100 as a rigid body can be used, realising any of the other manners of oscillation of the cylindrical support 100; in correspondence with the six degrees of freedom of a rigid body there are indeed three translational manners of oscillation and three rotational manners of oscillation to which respective frequencies of oscillation correspond.

In operation, with reference to the embodiment of the chemical deposition machine 1 and the weight measurement apparatus 10 illustrated in the attached FIGS. 1 and 8, the cylindrical support 100 for chemical deposition, with the target 40 associated, is mounted on the machine 1 associating the respective free ends with the opposite elastic constraints 11a, 11b. The machine 1 is then activated to start off the chemical deposition process, during which the cylindrical support 100 rotates upon itself and the burner 4 translates parallel to the cylindrical support 100 and deposits thereupon the chemical substances for the formation of the preform. The suction hood 5 eliminates the discharge gases produced by the burner 4.

During the chemical deposition process a measurement of the weight of the preform which is gradually being formed is repeatedly carried out through the apparatus 10. For such a purpose, an oscillation of the cylindrical support 100 is induced through the pneumatic device illustrated in FIG. 6 and described above (or alternatively through the magnetic device illustrated in FIG. 7 and also described above).

Through the optical distance measurer 41 a luminous signal is sent onto the target 40 and then detected. The signal thus obtained represents the variable distance between target 40 and optical measurer 41 and, therefore, contains information relative to the frequency of oscillation of the preform.

The electric signal detected by the optical measurer 41 is then sent to the calculator 112, where it is processed to finally work out, for example according to the calculation method described above, the progression of the weight of the preform as the chemical deposition process advances.

EXAMPLES

Different series of experimental tests have been carried out to demonstrate the operation of the apparatus of the present invention. The tests conducted were the following:
1. Reproducibility tests (with non-rotating preform)
2. Tests with rotating preform
3. Tests with different axial distributions of the masses
4. Tests with different spring temperatures The oscillation was caused generating an impulse capable of forcing a displacement of the cylindrical support 100 of about 5 mm with respect to the position of equilibrium. To detect the frequency of oscillation a commercial laser distance measurer, which can be acquired from the company Keyance, was used.

Reproducibility Tests

The first series of tests was carried out measuring the frequency of oscillation of a preform, not rotating, to which different known masses were added. For each value of additional mass different tests were carried out to evaluate the calibration curve of the system $M=M(w)$ and the degree of reproducibility of the measurements. The first series of tests was carried out without adding any mass to the preform. Three successive series of tests were carried out for three different values of additional mass.

The tests were conducted with a machine with a vertical attitude equipped with a single spring in correspondence with the lower end of the preform. The elastic constant of the spring was 1.6 kN/m. The starting mass of the preform was Kg. 2.690 (without any additional mass), whereas the end mass (mass of the preform plus maximum additional mass) was Kg. 4.990.

Figure 9:
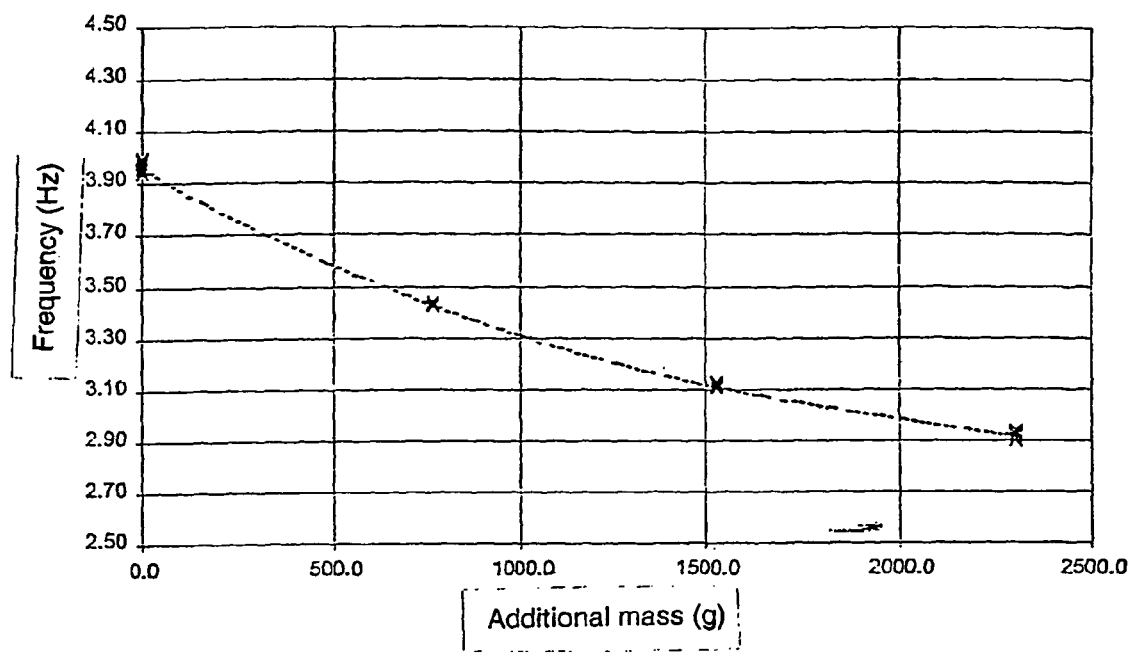
FIG. 9 shows a graph which depicts the results obtained experimentally through a first series of tests.

The results of these tests are shown in the graph of FIG. 9, which represents the frequency of oscillation measured as a function of the mass.

The calibration curve can for example be well described through a cubic polynomial.

A first estimation of the frequency values obtained through repeated tests using the same mass was made. Then an estimation was made for the different mass values.

The average standard deviation on the frequency estimation through repeated tests using the same mass is equal to 0.0116 Hz. Therefore it was proved that, through the repetition of even a small number of measurements, the average precision on the estimation of the weight can be very good.

Tests with a Rotating Preform

The second series of tests was carried out for the purpose of evaluating possible disturbances linked to the rotation of the preform. Different measurements were taken using the same weight of the preform at different rotation speeds.

The tests were conducted with a machine with a horizontal attitude equipped with two springs in correspondence with the opposite ends of the preform. The elastic constant of the springs was 1.6 kN/m. The mass of the preform was kept constant and equal to Kg. 2.690.

Figure 10:
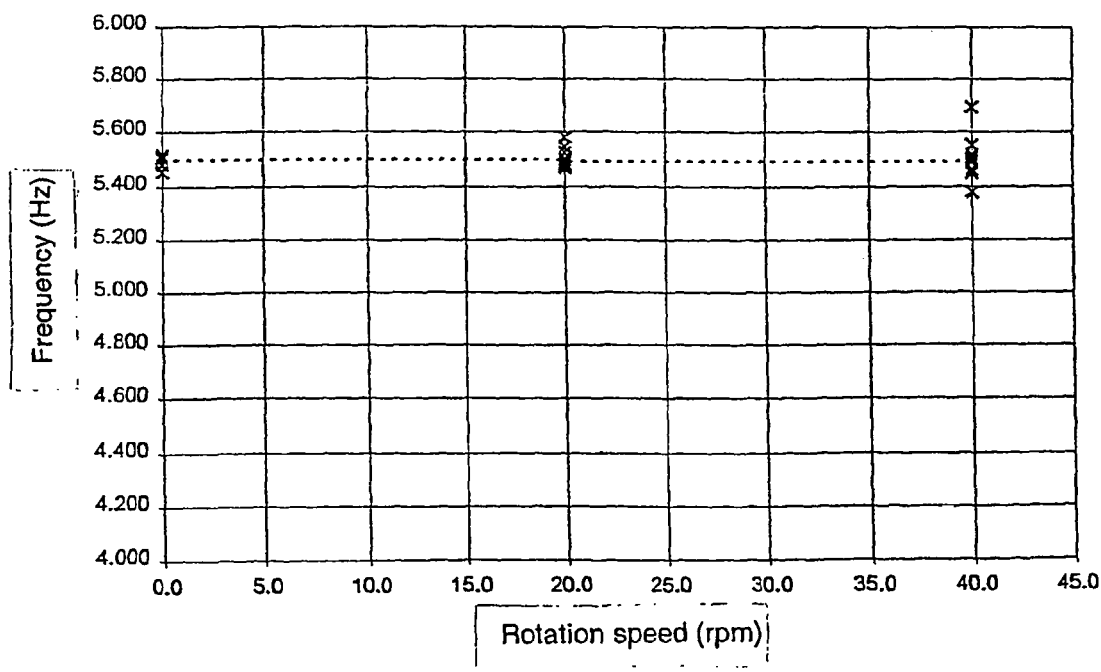
FIG. 10 shows a graph which depicts the results obtained experimentally through a second series of tests.

The graph of FIG. 10 shows the results of these measurements which demonstrate a substantial independence of the frequency of oscillation from the rotation speed of the preform. Indeed, we observed an increase in the standard deviation of the measurements, which however keep the same average value.

Tests with Different Axial Distributions of the Masses

The third series of tests was carried out for the purpose of demonstrating that the method for measuring weight of the present invention is substantially independent from the distribution of the masses along the axis of the preform.

Two series of measurements using the same additional mass were conducted:
 with additional weight in correspondence with one of the ends of the preform;
 with additional weight in correspondence with the opposite end of the preform.

The tests were conducted with a machine with a horizontal attitude equipped with two identical springs in correspondence with the opposite ends of the preform. The elastic constant of the springs was 1.6 kN/m. The preform was not made to rotate. The starting mass of the preform was Kg. 2.690 (without any additional mass), whereas the additional mass (first on one side and then on the other) was Kg. 0.762.

Figure 11:
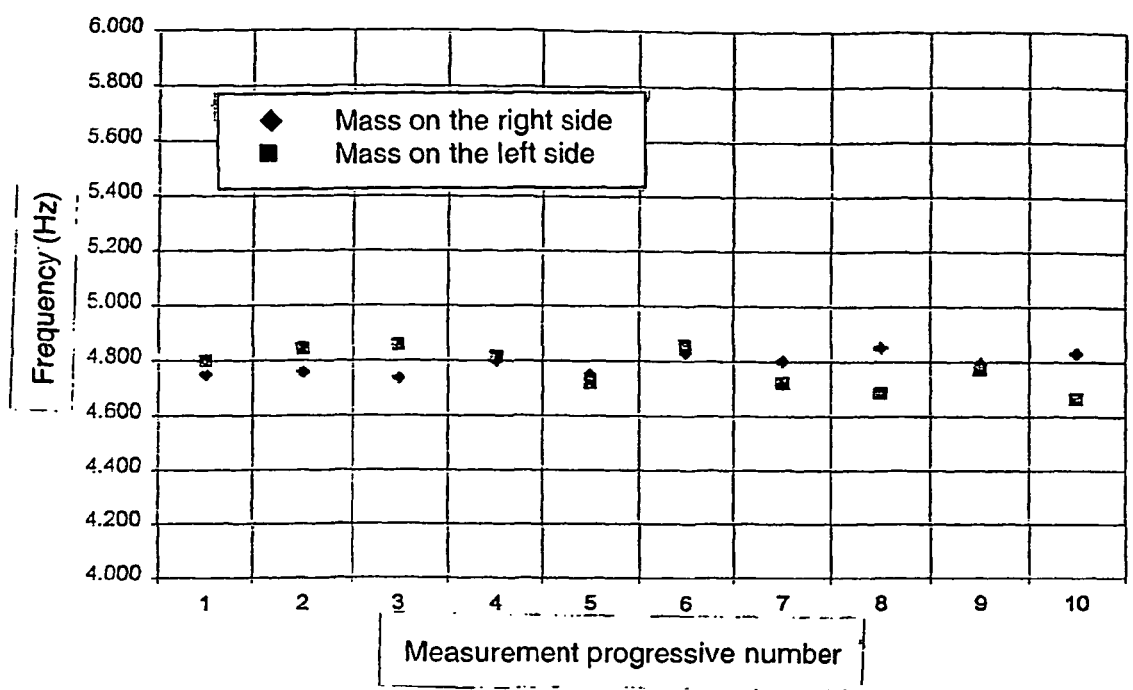
FIG. 11 shows a graph which depicts the results obtained experimentally through a third series of tests.

The two series of tests, shown in FIG. 11, do not outline significant differences in the average value.

Tests with Different Spring Temperatures

The fourth series of tests was carried out for the purpose of demonstrating the insensitivity of the weight measurement method of the present invention to temperature, in particular to the presence of thermal gradients on the structure. Different measurements were taken as the temperature of an air jet directed onto one of the two elastic constraints varied. The thermal field which generates in this way has the maximum and minimum temperature in correspondence with the extremes of the elastic constraint under consideration, which is therefore subject to thermal gradients.

The tests were conducted with a machine with a horizontal attitude equipped with two identical springs in correspondence with the opposite ends of the preform. The elastic constants of the springs was 5.15 kN/m. Just one of the two springs was biased. The preform was not made to rotate. The mass of the preform was kept constant and equal to Kg. 2.690.

Figure 12:
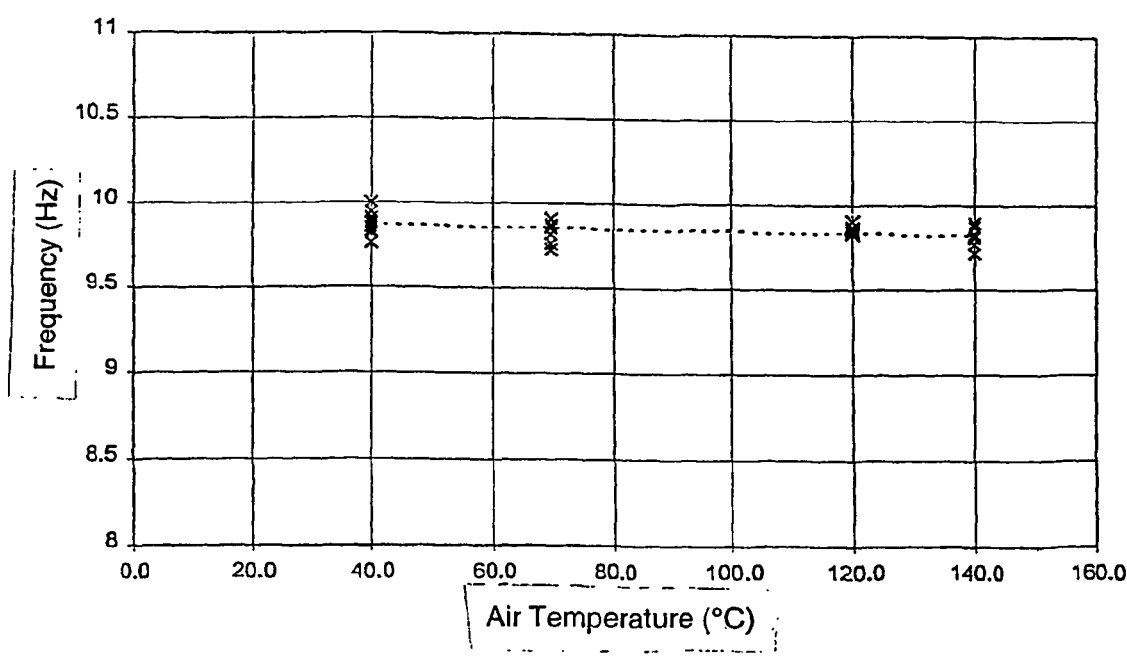
FIG. 12 shows a graph which depicts the results obtained experimentally through a fourth series of tests.

The graph of FIG. 12 shows the results of these tests which demonstrate the actual insensitivity of the measurements with respect to the temperature.

What is claimed is:

1. A method for forming an optical fiber comprising the steps of:
   elastically constraining an elongated element comprising a chemical deposition substrate to a chemical deposition machine for the formation of the preform;
   inducing an oscillation of said elongated element depositing material on the elongated element to form the perform;
   detecting the frequency of oscillation of said elongated element; and
   calculating the weight of the preform based on the detected frequency of oscillation;
   and forming an optical fiber from the perform.

2. The method according to claim 1, wherein the step of inducing an oscillation of said elongated element comprises the following steps:

supplying pressurised air, for a predetermined time, inside a seat housing an end portion of said elongated element; and discharging the air from said seat after said predetermined time.

3. The method according to claim 1, wherein the step of inducing an oscillation of said elongated element comprises the following steps:

supplying current, for a predetermined time, into a solenoid arranged on the outside of and coaxially to a coupling element rigidly associated with said elongated element, such a coupling element comprising at least one permanent magnet; and interrupting the supply of current after said predetermined time.

4. The method according to claim 1, wherein the step of detecting the frequency of oscillation of said elongated element comprises the following steps:

generating a signal representing the position in time of said elongated element; and processing said signal to work out the frequency of oscillation of the elongated element.

5. The method according to claim 4, wherein the step of generating a signal representing the position in time of said elongated element comprises the steps of:

sending a luminous signal toward a target rigidly associated with said elongated element;

collecting a luminous signal scattered by said target; and processing the collected luminous signal to generate an electric signal representing the distance of said target.

6. The method of claim 1, wherein inducing an oscillation of said elongated element with the preform at least partially formed on the elongated element includes causing the elongated element to slide relative to a support from which the elongated element is suspended.

7. The method of claim 6, wherein causing the elongated element to slide relative to a support from which the elongated element is suspended includes causing the elongated element to slide in a direction of an axis of the elongated element.

8. The method of claim 1, wherein inducing an oscillation of said elongated element with the preform at least partially formed on the elongated element includes causing the elongated element to slide relative to a sleeve from which the elongated element is suspended.

9. The method of claim 8, wherein causing the elongated element to slide relative to a sleeve from which the elongated element is suspended includes causing the elongated element to oscillate in a direction of an axis of the elongated element.

10. The method of claim 1, wherein inducing an oscillation of said elongated element with the preform at least partially formed on the elongated element includes causing the elongated element to oscillate in a direction of an axis of the elongated element.

* * * * *